A. Walker
Sheet 1, 2 Sheets.
Armor Clad.
No. 1,608.
Reissued Jan. 19, 1864.
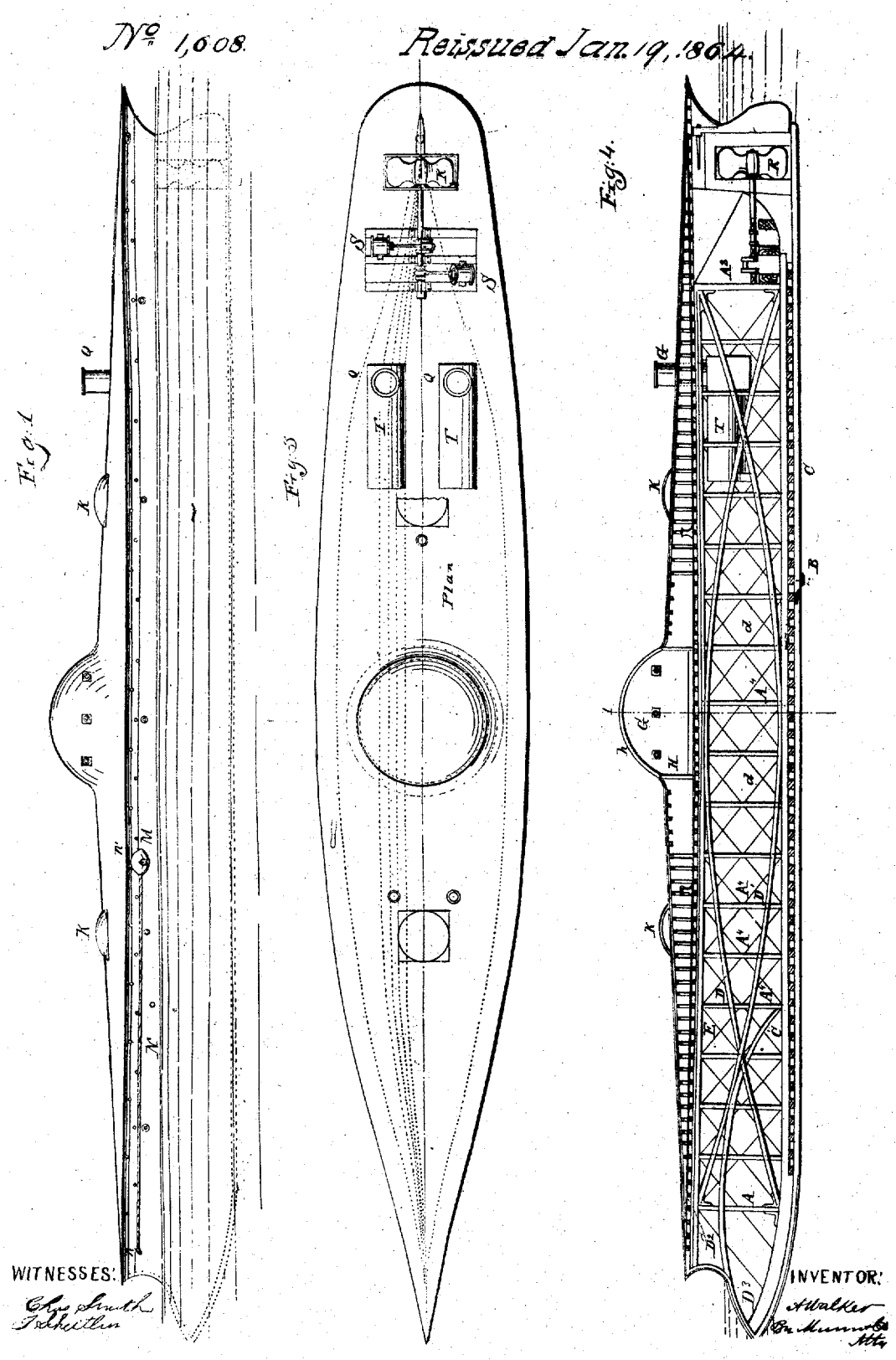

A. Walker. Sheet 2, 2 Sheets

Armor Clad.

No. 1,608. Reissued Jan. 19, 1864.

WITNESSES.

Chas. Smith
J. Shields

INVENTOR:

A. Walker
By Munn & Co
Atty.

UNITED STATES PATENT OFFICE.

AUGUSTUS WALKER, OF BUFFALO, NEW YORK.

MPROVEMENT IN THE CONSTRUCTION OF STEAM AND SAILING VESSELS FOR NAVAL AND MERCHANT SERVICE.

Specification forming part of Letters Patent No. 39,708, dated May 23, 1863; Reissue No. 1,608, dated January 19, 1864.

*To all whom it may concern:*

Be it known that I, AUGUSTUS WALKER, of the city of Buffalo, in the county of Erie and State of New York, have invented a certain new and useful improvement in steam and sailing vessels, both for naval and merchant service, and in mode of arming and working the same; and I do hereby declare the following to be a full and exact description of the same, reference being had to the accompanying drawings, making part of this specification, in which—

Figure 6:
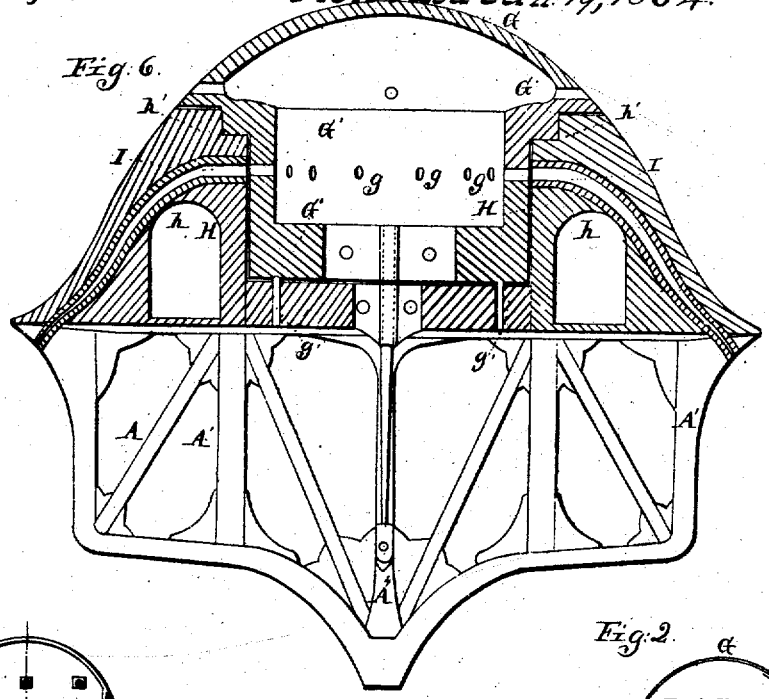
Figure 5:
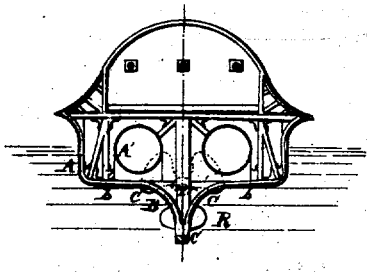
Figure 2:
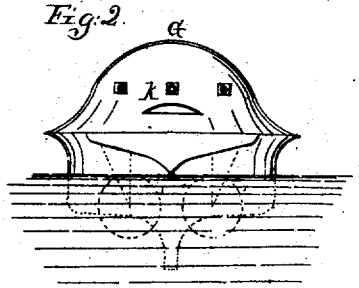
Figure 7:
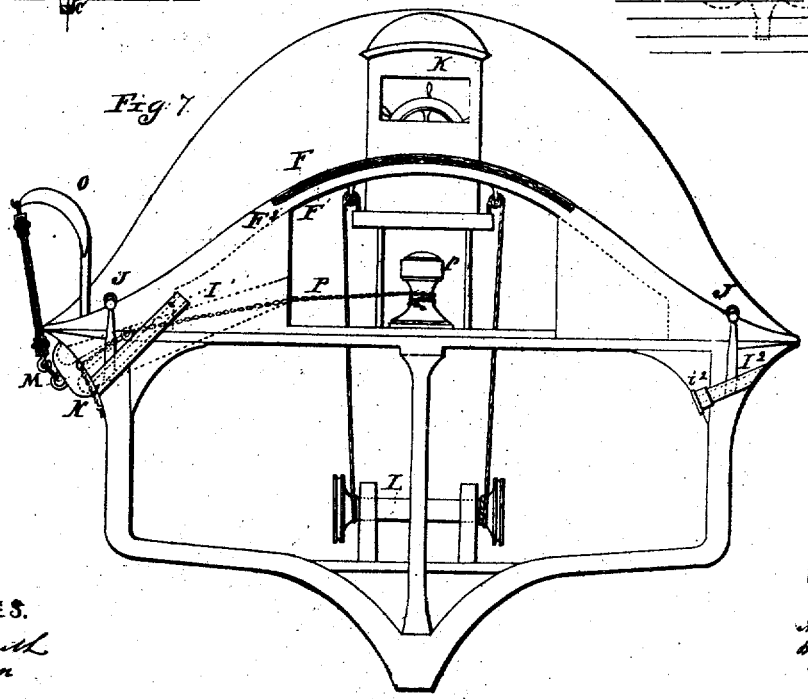

Figure 1 is a side view of a vessel illustrating my invention. Fig. 2 is a stern view of the same. Fig. 3 is a plan thereof. Fig. 4 is a central longitudinal section thereof. Fig. 5 is a transverse section thereof on the line 1 1. Fig. 6 is a transverse section on a larger scale in the same plane, illustrating more clearly some peculiar features hereinafter described. Fig. 7 is a transverse section on the line 2 2, on the same scale as Fig. 6.

Similar letters of reference indicate corresponding parts in the several views.

My said invention consists, first, in the use of one or more arches or truss-frames, applied longitudinally in the center of the hull for the purpose of strengthening the latter; second, in the combination of a series of central longitudinal arches with a bottom of peculiar form; third, in a peculiarly constructed prow, employed for the purpose of a ram; fourth, in devices for ventilating the interior of the ship without danger of the entrance of water or projectiles; fifth, in a peculiar manner of mounting and sustaining a revolving turret; sixth, in a peculiar construction of movable pilot-houses and devices for raising and lowering the same; seventh, in devices for working the anchors.

In order that others skilled in the art to which my invention appertains may be enabled to fully understand and use the same, I will proceed to describe its construction, and operation.

A A′ $A^2$ $A^3$ $A^4$ represent various parts of the framing of the ship. The bottom B is made in double concave form, as shown in Fig. 5, terminating in a central keel, C.

D D′ are respectively a direct and an inverted arch, terminating at each end at the king-posts $A^2$ $A^3$, and extending vertically from the deck-beams E to the keelson C′. The arches D D′ and the vertical frames $A^4$, near the longitudinal center of the ship, are tightly bound together by metallic rods, *d d*, so that the whole will constitute truss-frames of the greatest possible strength and rigidity, adapting the ship to be sustained by her center or by her ends without injury.

$D^2$ represents an additional arch extending from one of the central frames, $A^4$, to the extreme bow, and inclosing and sustaining a prow, $D^3$, constructed of iron or steel, arched both vertically and horizontally, so as to give it great strength. The form of the outline of the said prow in its vertical section is clearly shown in Fig. 4. In its horizontal section it follows round from the stern in contact with the skin of the vessel terminating at the longitudinal center in front of one of the stanchions $A^4$, as before explained. To adapt it to resist a crushing strain, and at the same time avoid unnecessary weight, the interior of the prow is filled with timber. This peculiar construction of prow does not interfere in any manner with the correct lines of the ship or change her external form in any degree.

The entire deck and sides of the vessel (above and to the required distance below the water-line) are protected by metallic armor of peculiar construction. It consists of two straight plates, F F′, (Fig. 7,) with a corrugated plate, $F^2$, between them. The corrugations in the plate $F^2$ are filled with india-rubber or any elastic material. This peculiar construction of armor is adapted by its yielding nature to resist projectiles very effectually, and hence is not required to be of great weight.

G represents a shot-proof turret, supported upon or within a casing, H, within which the guns are mounted. The top of the turret may be stationary and permanently secured to the casing or foundation H, and pierced with ports at suitable distances, or the entire turret or the floor upon which the guns are mounted may be revolved within the casing H. The said casing consists essentially of a circular arch, *h*, as shown in Fig. 6, giving it great strength both vertically and horizontally, which arch may be surmounted by a rabbet, *h′*, to support the revolving parts. This structure affords very firm support to the turret, and, together with the peculiar construction and form of deck shown in Figs. 4 and 6, effectually protects it from any injury from an enemy's shot which would endanger its free rotation. The ventilation of the turret is provided for by tubes I I, constituting at their outer ends mere slits of about two inches in vertical width and two feet in length. These tubes extend inward and upward in curved form and inclined direction to the interior of the casing H, where they may be twelve inches square.

*g g g* represent a series of apertures in the turret, which communicate with the inner ends of the tubes I in such a manner as to permit the ingress of fresh air in any position of the turret. Any requisite number of the tubes I may be employed, converging from both sides forward and abaft the turret, as well as directly alongside thereof. The form and inclination of the tubes prevent the possibility of the entrance of shot or water, and adapt them to create a forcible and constant draft of air. The top of the turret is dome-shaped, and the whole upper deck is of convex form, and the sides are inclined inward, so that no part of the ship above the water-line presents a perpendicular surface to receive the direct impact of an enemy's shot.

$I'$ $I^2$ are ventilating-tubes for admitting air and light to the cabins and hold. The tubes $I'$ incline upward from the outside, and under ordinary circumstances will in this way be protected from the entrance of water. The tubes, $I^2$, by which the cabins and state-rooms are ventilated, may be closed by shot-proof caps $t^2$ to exclude water and projectiles in rough weather or when in action.

J J represent sliding stanchions, which, while the vessel is under way, may project above the upper deck, but while in action are lowered to the position shown in Fig. 7, and thus constitute plugs which close the tubes $I'$ $I^2$. A life line or chain rove through eyes or rings at the tops of the stanchions serves as a rail or guard while they are in their upper positions.

K K represent dome-stopped pilot-houses adapted to slide up and down in the upper deck, and constituting the only way of access below decks. While the ship is under way the said pilot-houses being raised to their upper positions by windlasses L, and there sustained by spring-catches, pawls, or any other suitable means, afford additional means of ventilation and a full and free lookout. When in action, the pilot-houses are lowered, so that only their convex tops will remain above the deck, and thus afford no available mark for the enemy's shot. The roofs are pierced with narrow slits, affording sufficient lookout for steering or other purposes, and at the same time preventing the entrance of large or small shot.

M M represent circular fluked anchors attached to cables N, running out through hawse-holes *n* at the bow. To weigh the anchor, it is first hove up to the hawse-holes in the usual manner, after which a stopper, P, leading from a port, *n'*, is rove through the ring and the anchor drawn back, while the cable is paid out from the hawse-hole. When the anchor approaches the anchor-port *n'*, a block and tackle let down from a crane, O, is hooked to a smaller ring attached to the crown of the anchor, as shown in Fig. 7 of the drawings, and the anchor, being thus elevated to a horizontal position, is hove inboard by the stopper P, which is attached to a capstan, *p*, for this purpose. When thus hove in, the circular fluke of the anchor completely closes the port. These anchor-ports are on an inclined plane, being reduced to one-fourth the size of the outer diameter, extending inboard to its terminus. From the peculiar construction of this anchor-port the anchor goes overboard from its own weight as soon as the ring-stopper is let go. Should the vessel be in action while at anchor, these ports may be closed in any suitable manner.

The relative positions of the hawse-holes *n* and ports *n'* are shown in Fig. 1. By this mode of stowing away the anchor the bow is left clear and the anchor preserved from danger of injury in the event of collision. The cranes O may likewise be employed as davits for raising the ship's boats and depositing them in suitable receptacles on deck.

Q Q represents smoke-stacks adapted to slide down to a level with the deck during action.

R represents a propeller, of which there may be one, as shown in Fig. 5, or two, as represented in dotted lines in Fig. 2. The said propeller may be driven by a pair of oscillating engines, S S, so arranged as to avoid dead-centers on the cranks.

T T represent the boilers.

The coal-bunkers will be located in the lower hold and filled through dumpers protected by shot-proof gratings. The side frames, A A', are placed alternately in inclined and vertical positions to afford the requisite strength. All anchors and moorings are worked from within the vessel between decks. The turret G, containing the guns, is operated through the medium of the engines, which are located in the hold.

I am aware that it has before been proposed to strengthen ships' hulls with longitudinal truss-frames of different construction from mine, and likewise that various forms of more or less concave bottoms have before been devised, located at a greater or less distance from the center of the hull; but I am not aware that a vessel of any form or for any purpose has before been constructed with a vertical truss-frame extending longitudinally through the center of the hull.

The principal advantage of thus locating the said longitudinal truss-frame in the center of the hull is that it affords greater strength than when otherwise located. It will also be apparent that in keel-vessels a greater vertical depth is afforded for the frame in the center than elsewhere, and also that greater strength may be secured by framing the truss or arch directly into the keel or keelson.

The advantages of my peculiar combination of truss framing and double-concave bottom are, first, to combine strength, seaworthiness, and a high rate of speed, the arches being of great vertical depth and the displacement of water chiefly near the surface, while at the same time the keel extends to a sufficient depth; second, to protect the screws from injury and admit the power to be applied in solid water below the main displacement of the ship; third, the interior of the concave bottom above the keelson affords a safe and convenient location for the magazine well below the water-line and beyond danger of injury.

The vessel is comely in her model, affords ample and well-ventilated apartments for officers immediately below the upper deck, and is in every way adapted to constitute a most formidable ship of war. The movable pilot-houses are the only means of ingress to the interior, and when these are lowered, preparatory to action, the ship is impossible to board, no foothold or place of entrance being left.

The invention is applicable to both steam and sailing vessels for naval and merchant service, ocean and inland.

Having thus described my invention, what I claim as new therein, and desire to secure by Letters Patent, is—

1. Constructing a vessel with one or more longitudinal arches or truss-frames, applied in vertical position to the center of the hull, for the purpose of strengthening it, substantially as set forth.

2. The combination of the central longitudinal truss-framing or arch and double-concave bottom, constructed substantially as described.

3. The doubly-arched prow or ram $D^3$, constructed and supported as described.

4. The ventilating-tubes $I'$ $I^2$, closable by the stanchions J J, substantially as described.

5. The casing H, constructed with a circular arch *h* for sustaining the turret G, substantially as specified.

6. In connection with a vessel of the above construction, the sliding pilot-houses K K, elevated and sustained in any way substantially as described.

7. The described position and means of working the anchors.

Witnesses: AUGUSTUS WALKER.
OCTAVIUS KNIGHT,
CHAS. D. SMITH.